| United States Patent [19] | [11] | 4,278,609 |
|---|---|---|
| Kuiper | [45] | Jul. 14, 1981 |

[54] PROCESS FOR THE SELECTIVE HYDROGENATION OF TRIGLYCERIDE OILS WITH A METALLIC CATALYST IN THE PRESENCE OF AMMONIA

[75] Inventor: Jan Kuiper, Vlaardingen, Netherlands

[73] Assignee: Lever Brothers Company, New York, N.Y.

[21] Appl. No.: 159,757

[22] Filed: Jun. 16, 1980

[30] Foreign Application Priority Data

Jun. 19, 1979 [NL] Netherlands ......................... 7904781

[51] Int. Cl.$^3$ ............................................. C11C 3/12
[52] U.S. Cl. .................................... 260/409; 252/438
[58] Field of Search ........................ 260/409; 252/438

[56] References Cited

U.S. PATENT DOCUMENTS

| 4,117,242 | 9/1978 | Fozzard | 260/409 |
| 4,161,483 | 7/1979 | Cahen | 260/409 |
| 4,228,088 | 10/1980 | Kuiper | 260/409 |

Primary Examiner—John F. Niebling
Attorney, Agent, or Firm—Melvin H. Kurtz

[57] ABSTRACT

Triglyceride oils, which contain besides fatty acids having two double bonds, fatty acids having more than two double bonds, are hydrogenated using palladium, platinum, rhodium and/or iridium as a catalyst, the catalyst being treated with dry ammonia. The hydrogenation is carried out at a temperature of at least 100° C. The hydrogenation progresses in a particularly selective manner. On using, for instance, soyabean oil, which contains about 55% of linoleic acid and 7% of linolenic acid, the amount of linolenic acid can be reduced to 2%, whereby more than 45% of linoleic acid is retained in the hydrogenated product. In case the catalyst is not treated, said amount is only about 35%.

10 Claims, No Drawings

PROCESS FOR THE SELECTIVE HYDROGENATION OF TRIGLYCERIDE OILS WITH A METALLIC CATALYST IN THE PRESENCE OF AMMONIA

The invention relates to a process for the selective hydrogenation of unsaturated fatty acid derivatives, such as triglycerides, which contain besides fatty acids with two double bonds, fatty acids with more than two double bonds.

As is generally known, oils and fats consist mainly of a mixture of triglycerides of fatty acids. The fatty acids usually contain about 16 to about 22 carbon atoms and may be saturated, e.g. stearic acid; mono-unsaturated, e.g. oleic acid; di-unsaturated, e.g. linoleic acid; or tri-unsaturated. e.g. linolenic acid, or may even be unsaturated to a greater degree.

In the field of technology relating to oils and fats it is usual to hydrogenate oils in order to remove the unsaturation partly, a hydrogenated oil being obtained having the desired properties, such as a higher melting point and/or increased stability.

During the hydrogenation a number of reactions take place, both successively and simultaneously. Accordingly, for example, in the hydrogenation of linolenic acid the hydrogenation reactions can be represented by the following simplified scheme: linolenic acid $\rightarrow K_1$ linoleic acid $\rightarrow K_2$ oleic acid $\rightarrow K_3$ stearic acid, the rate constants of the reactions being indicated with $K_1$, $K_2$, etc. Moreover, side reactions occur, such as displacement and isomerisation of double bonds. Isomerisation gives rise to the conversion of cis-double bonds into trans-double bonds, the corresponding oils which contain the trans-acids usually having a higher melting point. Oils and fats which have a high content of stearic acid have a melting point that for most applications is too high to be organoleptically acceptable. Formerly it was therefore usual to direct the hydrogenation in such a way that as little stearic acid was formed as possible, but that still a high content of trans-oleic acid was obtained, so that the oil had the desired melting point. Nowadays it is considered less desirable to apply cis-trans isomerisation since there is a shift to liquid, though stable oils, which are used as such or serve as ingredient for soft margarines which are stored in the refrigerator.

The selectivity values of the hydrogenation reactions are usually defined as follows:

$$S_I = \frac{K_2}{K_3} \qquad S_{II} = \frac{K_1}{K_2}$$

When the $S_I$ value of the reaction is high, small amounts of saturated acids are obtained. With a high $S_{II}$ value it is possible to hydrogenate linolenic acid and still retain a high percentage of the essential fatty acid: linoleic acid. With the isomerisation-selectivity value, abbreviated to $S_i$, the amount of trans-isomers is indicated that is formed in relation to the degree of hydrogenation. As was already observed, it is wanted at present that the hydrogenation be influenced in such a way that the $S_i$ value is as low as possible.

However, according to the current practice with hydrogenation, that is usually carried out at a high temperature and under elevated pressure with the aid of a nickel catalyst supported on a carrier, a not unimportant isomerisation of double bonds cannot be avoided.

The use of some catalysts, for example copper catalysts, has been proposed on account of their higher selectivity. Although it is true that such catalysts are more selective, the degree of isomerisation they bring about is, however, about the same as that of nickel.

The use of palladium has been proposed for the selective hydrogenation of soyabean oil (Belgian patent specification 851,202. Although these catalysts are selective, the content of linoleic acid obtained with them is not higher than 40% at a linolenic acid content of 2% when a soyabean oil containing 7-9% of linolenic acid and 50-55% of linoleic acid is used as starting material.

According to Belgian patent specification 872,476 triglyceride oils are hydrogenated with the aid of a nickel cartalyst which has been treated with a basic nitrogen compound, including ammonia, the molar ratio of nitrogen:nickel being about 0.05-0.4:1.

According to Belgian patent specification 872,477 the hydrogenation of triglyceride oils is carried out by means of a nickel catalyst in the presence of a basic nitrogen compound, in which the molar ratio of nitrogen:nickel is about 0.05-0.4:1.

According to the last two patent specifications the hydrogenation is carried out at a temperature of 100° to 175° C. Also according to the last two processes in the hydrogenation of soya oil to a linolenic acid content of 2%, linoleic acid contents are obtained lower than 40%, the transisomer content in the hydrogenated product being about 15 to 20%.

It has now been found, surprisingly, that with the hydrogenation of triglyceride oils with the aid of metallic catalysts an excellent selectivity and very low trans-contents are obtained when ammonia is present during hydrogenation.

The invention is therefore concerned with a process for the selective hydrogenation of unsaturated fatty acid derivatives which contain besides fatty acids having two double bonds fatty acids having more than two double bonds, in the presence of a catalytically active metal of group VIII of the periodic system of the elements that as a promoter can contain a metal of the same or another group of the periodic system, and has been treated with a nitrogen compound, which process is characterized in that as the catalytically active metal palladium, platinum, rhodium or iridium is used which has been treated with dry ammonia in a molar ratio of ammonia to metal of at least 100:1, and hydrogenation is carried out at a temperature ranging from −20° to 100° C.

From a technical point of view, the process according to the invention has important advantages, because it can be carried out very simply, ammonia is a very easily obtainable and cheap substance and can very easily be removed from the hydrogenated oil.

It has now been found that with the process according to the invention the hydrogenation is influenced in such a way that a selective hydrogenation of polyunsaturated fatty acid groups takes place without any formation of saturated fatty acid groups at all, while relatively few trans-isomers are formed. Moreover, the invention is characterized in that linolenic acid groups (or trienoic acid groups), if present, are hydrogenated more readily than dienoic acid (linoleic acid) groups with the result that products are formed which have a low content of linolenic acid and a high content of linoleic acid.

As the catalytically active metals, of which palladium and platinum are preferred, also alloys of these metals may be used. Such catalytically active metals may contain promoters, i.e., metals that promote the effect of the catalyst with respect to its activity and/or selectivity, such as Cu, Ag, Au, Zn, Sn, Ti, Hf, V, Nb, Ta, Zr, Cr, Mo, W or Mn.

The catalyst can be used in the form of a porous metal supported on a carrier in sheet-form that is immersed in the system, or preferably in the form of small particles, such as palladium powder, suspended in the system, or a metal sol obtained by reduction of a soluble compound of the metal with a reducing organo-metallic compound. The metallic component can be supported on a carrier. Carbon, silicon dioxide, aluminium dioxide, kieselguhr or an ion-exchange resin can, for example, be used as carrier for the catalyst.

The amount of catalytically active material used for the hydrogenation is not critical and can vary from 1 mg/kg to 10 g/kg, calculated on the basis of the metal with respect to the compound to be hydrogenated, as this amount is dependent on the form of the catalyst, whether supported on a carrier or not, on the specific surface area of the catalyst, on the catalytic activity of the metal used, on the amount of ammonia added, and on other factors.

The activity, selectivity and the formation of trans-isomers effected during hydrogenation with the addition of a certain amount of ammonia are dependent on the amount of the type of catalyst. When a triglyceride oil is hydrogenated, the quality of the oil and the refining process of the crude oil influence the hydrogenation characteristics when different amounts of ammonia are added.

The amount of ammonia to be added should at least be such that the molar ratio to the metal component of the catalyst is at least about 100:1 to achieve an adequate selectivity, i.e. that in the hydrogenation of an oil which contains besides fatty acids having two double bonds, fatty acids having more than two double bonds, an amount of at least 75% of the original fatty acids having two double bonds is retained. In general, these essential fatty acids are retained in an amount exceeding 80%, more often even exceeding 90%.

When the amount of ammonia is increased, the selectivity of the hydrogenation is enhanced, although on further increasing said amount, the effect will gradually decrease. At molar ratios of ammonia to catalytically active metal greater than about 2,000:1, no improvement is noticeable. However, larger amounts are not detrimental and the above-mentioned molar ratio may be 5,000:1 and above.

In carrying out the process of the invention the compound to be hydrogenated can be dissolved or dispersed in an organic liquid, such as a hydrocarbon, e.g. hexane, or a ketone. Good results are also obtained with alcohols, but in that case alcoholysis or esterification can take place; when alcoholysis or esterification is desirable, alcohols can therefore also be used.

The ratio of liquid to substrate is not critical and is usually not greater than about 20:1.

The hydrogenation can also be carried out in the pure compound.

Generally the hydrogenation is carried out in a suitable apparatus, such as a reaction vessel with a stirrer, or continuously in a series of reaction vessels with stirrer, though good results can also be obtained when the hydrogenation takes place over a column of catalyst particles.

The hydrogenation can be carried out by suspending the catalyst in the solvent, when this is used, under hydrogen, and to pass gaseous ammonia through the suspension for some time, for example for 1 to 10 minutes. Optionally the treated catalyst can now be isolated and be added to the substrate to be hydrogenated. The hydrogenation can also be started by adding the substrate to be hydrogenated and the hydrogen subsequently to the treated suspension. When the ammonia is introduced, the catalyst can also be suspended in the substrate to be hydrogenated or in a solution of the substrate in the solvent. The hydrogen gas, which is used for the hydrogenation, can also contain ammonia. Finally it is also possible to treat the catalyst first with liquid ammonia.

The temperature at which hydrogenation is carried out should be at least 100° C. Good results with active catalysts were obtained at temperatures from $-20°$ C., particularly at 10° C. to 60° C.

The reaction can be carried out under atmospheric pressure or under higher pressure; generally the pressure will vary from 100 to 2500 kPa. Naturally, if it is desired to work at a temperature above the boiling point of any liquid used, a pressure above atmospheric pressure should be applied.

The process can be regulated in a known manner, for example by stopping the hydrogenation when a previously calculated amount of hydrogen has been absorbed.

The process according to the invention can be applied for the hydrogenation of compounds or groups which contain more than one double bond in order to increase the selectivity of the hydrogenation reaction. Examples that can be mentioned are the hydrogenation of soybean oil, rapeseed oil, linseed oil, fish oils, tallow and similar animal fats, palm oil, esters of fatty acids, such as the methyl-, ethyl- and other alkylesters, soaps, alcohols and other fatty acid derivatives in which hydrogenation plays an important part.

The products can be used as deep-frying oil, table oil, as raw material for margarine or as raw material for the preparation of stable products such as soaps, esters, etc.

The invention is further illustrated by means of the following Examples. In some Examples the sum of the amounts of components does not add up to 100%, as less important fatty acid components, such as $C_{14}$-, $C_{17}$-, $C_{20}$- and $C_{22}$-fatty acids, are not mentioned. The composition of the substrates before and after hydrogenation is given in mol.%. Other percentages are calculated by weight.

In the Tables the fatty acids are designated by the number of carbon atoms present therein and the number of double bonds, that is to say C18:3 means linolenic acid and isomers, C18:2 means linoleic acid and isomers, etc.

EXAMPLE 1

The hydrogenation was carried out under atmospheric pressure and at room temperature in an apparatus consisting of a vessel with a net volume of 100 cm$^3$ and provided with a magnetic stirrer, four baffle plates, an inlet for hydrogen, an inlet for substrate and a device for drawing off samples.

The reactor was connected with a 500 cm$^3$ calibrated burette filled with hydrogen (purified over a copper catalyst (BTS) and a molecular sieve and paraffin oil).

The reactor was loaded with 60 g palladium on carbon (3%) and 70 cm$^3$ acetone. The reactor was repeatedly degassed and filled with hydrogen. The solution was stirred and after 15 minutes water-free ammonia was slowly bubbled through the solution for 5 minutes. Subsequently soyabean oil was added to the reactor and the hydrogenation was started.

At fixed intervals samples were drawn off for determination of the fatty acid composition by GLC and the trans-content by IR, as is shown in Table I. After the hydrogenation the ammonia concentration was determined by potentiometric titration with alcoholic HCL (in the present case (0.3 N NH$_3$).

Table II. The fatty acid composition at 2% C18:3 was determined by interpolation.

TABLE II

Selective catalyst hydrogenation of soyabean oil (25 g) in various media (70 cm$^3$) with 60 mg Pd/C as catalyst and water-free ammonia as additive.

| Solvent | Pd/C (mg) | NH$_3$ (m$^3$) | Fatty acid composition (mol. %) | | | | | Trans (mol.%) | Reaction time (min.) |
|---|---|---|---|---|---|---|---|---|---|
| | | | C16:0 | C18:0 | C18:1 | C18:2 | C18:3 | | |
| Starting oil | | | 10.6 | 3.6 | 23.3 | 55.7 | 6.6 | <1 | |
| Dimethyl formamide (DMF) | 60 | 0.3 | 10.7 | 3.5 | 30.9 | 52.9 | 1.7 | 6 | 100 |
| Ethyl acetate | 60 | 0.5 | 10.2 | 3.4 | 33.5 | 50.8 | 2.0 | 8 | 150 |
| Isopropanol | 60 | 1.5 | 10.6 | 3.6 | 33.1 | 50.5 | 2.0 | 6 | 100 |
| Hexane | 60 | 0.1 | 10.7 | 3.6 | 35.1 | 48.6 | 2.0 | 7 | 180 |
| Diglyme | 100 | 0.5 | 10.5 | 3.7 | 29.6 | 54.0 | 2.1 | 9 | 55 |
| Tetrahydrofuran (THF) | 160 | 0.15 | 10.4 | 3.7 | 34.3 | 49.6 | 2.0 | 7 | 57 |

TABLE I

| Hydrogenation time (min.) | Fatty acid composition (mol. %) | | | | | Trans (mol. %) |
|---|---|---|---|---|---|---|
| | C16:0 | C18:0 | C18:1 | C18:2 | C18:3 | |
| Starting oil | 10.6 | 3.6 | 23.3 | 55.7 | 6.6 | <1 |
| 40 | 10.7 | 3.7 | 30.2 | 52.7 | 2.8 | 5 |
| 57 | 10.6 | 3.6 | 32.9 | 52.0 | 1.9 | 7 |
| 81 | 10.5 | 4.0 | 37.3 | 46.8 | 1.4 | 8 |

In a comparative test in which no ammonia was used, but otherwise under the same conditions, the following result was obtained:

| Hydrogenation time (min.) | Fatty acid composition (mol. %) | | | | | Trans (mol. %) |
|---|---|---|---|---|---|---|
| | C16:0 | C18:0 | C18:1 | C18:2 | C18:3 | |
| 12 | 10.7 | 5.0 | 46.5 | 35.5 | 2.0 | 12 |

EXAMPLE 2

Example 1 was repeated, with the exception that other solvents were used instead of acetone and sometimes another amount of catalyst, as is indicated in

EXAMPLE 3

An investigation was made as to the effect of the amount of ammonia on the hydrogenation behaviour of soyabean oil.

In this Example a 1 dm$^3$ autoclave was used which was provided with a heating spiral through which thermostated water could be passed, a stirrer, an inlet for gases, a sampling device and a manometer.

Soyabean oil was hydrogenated in the autoclave at a temperature of 25° C. and a pressure of up to 500 kPa. In each experiment of the Example the autoclave was charged with 100 mg palladium per kg of oil of a 5% palladium-on-carbon catalyst, 250 ml of soyabean oil and 250 ml hexane. The reactor was degassed two or three times, flushed with argon and charged with different amounts of gaseous ammonia (cf. column I, Table III).

The reactor was subsequently charged with hydrogen and at intervals hydrogen was introduced to bring the pressure up to 500 kPa. The progress of the hydrogenation reaction was followed on the basis of the hydrogen uptake as indicated by the manometer. At regular intervals samples were taken to determine the fatty acid composition and the transisomer content, as expressed in Table III. The fatty acid composition at 2% C18:3 was determined by interpolation.

TABLE III

| Amount of ammonia added (mmol) | Hydrogenation time (min.) | Fatty acid composition (mol.%) | | | | | Trans (mol.%) |
|---|---|---|---|---|---|---|---|
| | | C16:0 | C18:0 | C18:1 | C18:2 | C18:3 | |
| | Starting oil | 10.6 | 4.0 | 23.0 | 53.0 | 7.0 | <1 |
| None | 16 | 10.5 | 9.0 | 43.6 | 33.3 | 2.0 | 7 |
| 50 | 35 | 10.5 | 4.8 | 37.9 | 43.3 | 2.0 | 6 |
| 100 | 40 | 10.6 | 4.0 | 35.1 | 46.8 | 2.0 | 6 |
| 200 | 46 | 10.6 | 4.2 | 32.7 | 49.1 | 2.0 | 6 |
| 300 | 43 | 10.5 | 4.2 | 30.8 | 51.0 | 2.0 | 6 |
| 400 | 59 | 10.6 | 4.0 | 30.5 | 51.5 | 2.0 | 6 |

EXAMPLE 4

Example 3 was repeated, with the exception that no solvent was used and that the reaction temperature was 30° C. The autoclave was charged with 500 ml of soyabean oil. The fatty acid composition and the transisomer content at 2° C. C18:3 is indicated in Table IV.

TABLE IV

| Amount of ammonia added (mmol.) | Hydrogenation time (min.) | Fatty acid composition (mol.%) | | | | | Trans (mol.%) |
|---|---|---|---|---|---|---|---|
| | | C16:0 | C18:0 | C18:1 | C18:2 | C18:3 | |
| | Starting oil | 10.6 | 4.0 | 23.0 | 53.0 | 7.0 | <1 |
| None | 43 | 10.6 | 6.5 | 43.5 | 35.5 | 2.0 | 9 |

TABLE IV-continued

| Amount of ammonia added (mmol.) | Hydrogenation time (min.) | Fatty acid composition (mol.%) | | | | | Trans (mol.%) |
|---|---|---|---|---|---|---|---|
| | | C16:0 | C18:0 | C18:1 | C18:2 | C18:3 | |
| 300 | 35 | 10.5 | 4.0 | 33.0 | 48.5 | 2.0 | 8 |

EXAMPLE 5

Example 3 was repeated, with the exception that the reaction temperature was 60° C. The results are given in Table V.

TABLE V

| Amount of ammonia added (mmol.) | Hydrogenation time (min.) | Fatty acid composition (mol.%) | | | | | Trans (mol.%) |
|---|---|---|---|---|---|---|---|
| | | C16:0 | C18:0 | C18:1 | C18:2 | C18:3 | |
| | Starting oil | 10.6 | 4.0 | 23.0 | 53.0 | 7.0 | <1 |
| None | 26 | 10.5 | 5.3 | 44.0 | 36.7 | 2.0 | 14 |
| 300 | 33 | 10.6 | 4.1 | 34.1 | 47.8 | 2.0 | 11 |

EXAMPLE 6

Example 3 was repeated, with the exception that rapeseed oil was hydrogenated at a temperature of 25° C., and that 200 mg Pd/kg oil were used.

The results are given in Table VI.

TABLE VI

| Amount of ammonia added (mmol.) | Hydrogenation time (min.) | Fatty acid composition (mol.%) | | | | | Trans (mol.%) |
|---|---|---|---|---|---|---|---|
| | | C16:0 | C18:0 | C18:1 | C18:2 | C18:3 | |
| | Starting oil | 4.4 | 1.4 | 54.0 | 21.7 | 12.1 | <1 |
| None | 14 | 4.4 | 7.7 | 64.9 | 14.6 | 2.0 | 9 |
| 400 | 107 | 4.4 | 1.7 | 60.2 | 25.3 | 2.0 | 11 |

EXAMPLE 7

The hydrogenation of soyabean oil was carried out at a pressure of up to 1000 kPa using platinum as a catalyst at 20° C. in an autoclave of 0.3 dm$^3$ volume, which was provided with an inlet for gases, a manometer, a stirrer and a sampling device.

The reactor was charged with 200 mg of a 5% platinum-on-carbon catalyst, 25 ml soyabean oil and 75 ml hexane. The autoclave was degassed two or three times, flushed with nitrogen and charged with gaseous ammonia.

The reactor was subsequently charged with hydrogen. The progress of the hydrogenation was followed on the basis of the hydrogen uptake as indicated by the manometer. At regular intervals samples were taken to determine the fatty acid composition and the transisomer content, as expressed in Table VII.

The fatty acid composition at 2% C18:3 after hydrogenation was: 10.6% C16:0, 7.6% C18:0, 41.6% C18:1, 38.0% C18:2. The hydrogenation time was 270 minutes.

A similar hydrogenation without the addition of ammonia was carried out in the glass reactor of Example 1 using a hydrogen pressure of 100 kPa and 120 mg of the 5% rhodium-on-carbon catalyst.

At 2% C18:3 the fatty acid composition was: 10.5% C16:0, 19.8% C18:0, 34.7% C18:1 and 32% C18:2.

The hydrogenation time was 72 minutes.

TABLE VII

| Amount of ammonia added (mmol.) | Hydrogenation time (min.) | Fatty acid composition (mol.%) | | | | | Trans (mol.%) |
|---|---|---|---|---|---|---|---|
| | | C16:0 | C18:0 | C18:1 | C18:2 | C18:3 | |
| | Starting oil | 10.7 | 4.0 | 25.3 | 53.1 | 6.7 | <1 |
| 20 | 45 | 10.7 | 5.3 | 31.7 | 48.1 | 4.1 | <1 |
| | 90 | 10.6 | 6.1 | 37.9 | 43.1 | 2.2 | <1 |
| | 130 | 10.7 | 7.6 | 45.8 | 39.9 | 0.9 | <1 |

EXAMPLE 8

Example 7 was repeated, with the exception that as the catalyst 400 mg of a 5% rhodium-on-carbon catalyst was used.

I claim:

1. Process for the selective hydrogenation of fatty acid derivatives, which contain besides fatty acids with two double bonds fatty acids with more than two double bonds, by contacting the fatty acid derivative with hydrogen at a temperature of −20° to 100° C. in the presence of a hydrogenation catalyst chosen from the group consisting of palladium, platinum, rhodium and iridium, which catalyst is treated with dry ammonia in a molar ratio of ammonia to the metal component of the catalyst of 100:1 to 5000:1.

2. Process according to claim 1, in which the catalyst is treated with gaseous or liquid ammonia.

3. Process according to claim 1, in which before the hydrogenation is started a suspension of the catalyst is treated with gaseous or liquid ammonia.

4. Process according to claim 1, in which a suspension of the catalyst in the fatty acid derivative is treated with gaseous or liquid ammonia.

5. Process according to claim 1, in which a suspension of the catalyst in an organic solvent is treated with gaseous or liquid ammonia.

6. Process according to claim 5, in which after the treatment of the suspension with the ammonia, the catalyst is separated from the suspension and thereafter added to the fatty acid derivative.

7. Process according to claim 1, in which a suspension of the catalyst in a solution of the fatty acid derivative in an organic solvent is treated with the ammonia.

8. Process according to claim 1, in which ammonia is added to the hydrogen used for the hydrogenation.

9. Process according to claim 1, in which the hydrogenation is carried out at a temperature of 0° to 60° C.

10. Process according to claim 1, in which an edible triglyceride oil is hydrogenated.

* * * * *